Figure 1:
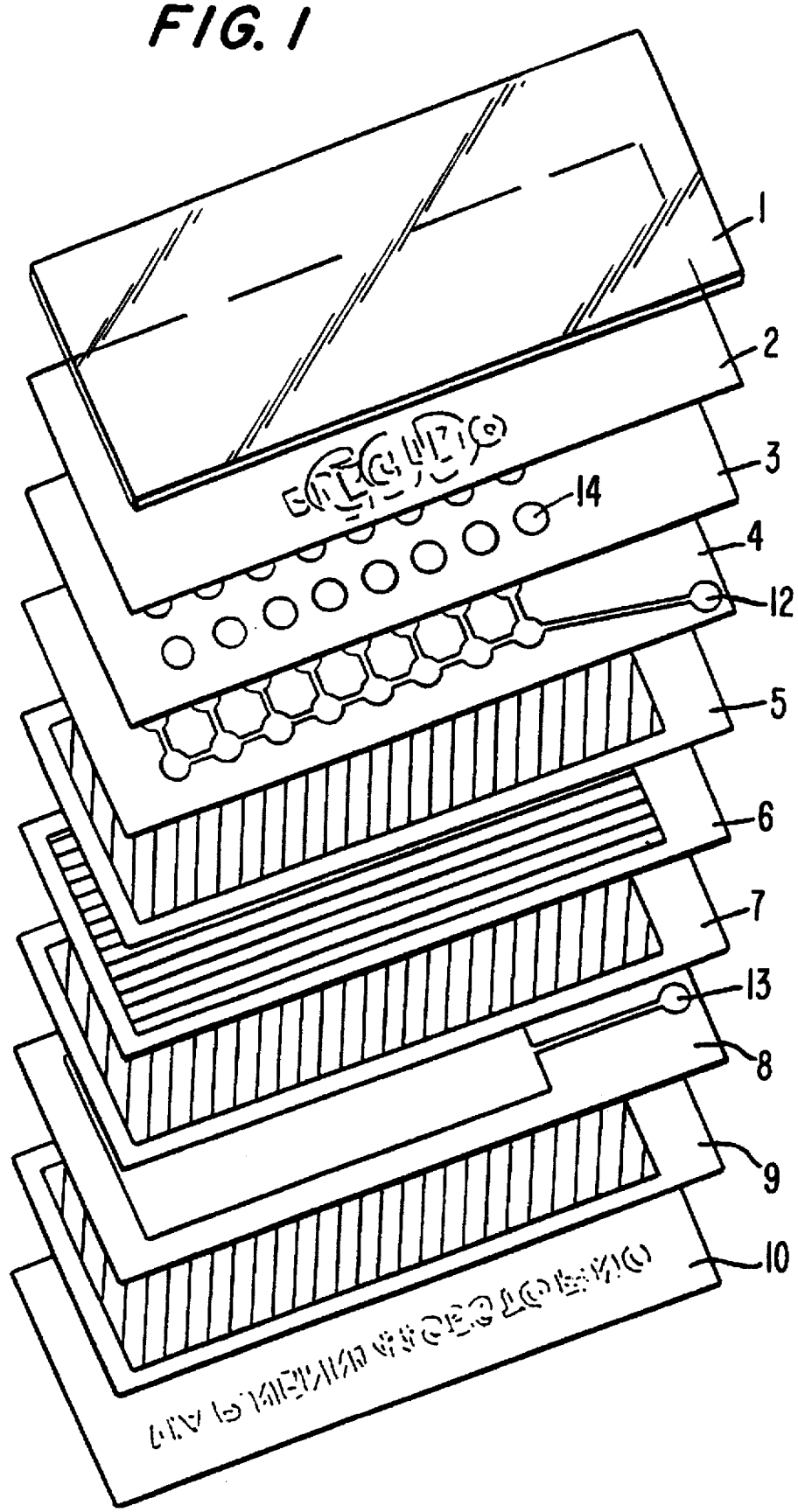

United States Patent [19]

Luciano

[11] Patent Number: 5,690,366
[45] Date of Patent: Nov. 25, 1997

[54] IDENTIFICATION DOCUMENT CHARACTERIZED BY AN ELECTROLUMINESCENCE EFFECT AND THE PROCEDURE FOR ITS REALIZING

[76] Inventor: Abbatemaggio Luciano, Via Don L. Milani, 4-Scandicci FI, Italy

[21] Appl. No.: 460,118

[22] Filed: Jun. 2, 1995

Related U.S. Application Data

[62] Division of Ser. No. 230,129, Apr. 20, 1994, abandoned.

[30] Foreign Application Priority Data

Apr. 20, 1993 [IT] Italy ................................ FI93A0078

[51] Int. Cl.$^6$ ................................................ B42D 15/10
[52] U.S. Cl. .......................... 283/83; 283/85; 283/91; 283/92; 283/94; 283/904; 235/491; 428/917
[58] Field of Search ........................... 283/83, 85, 91, 283/92, 94, 98, 107–111, 901, 904; D19/9–12; 428/690, 916, 917, 901; 235/380, 491, 454; 40/544

[56] References Cited

U.S. PATENT DOCUMENTS

| | | |
|---|---|---|
| 2,721,808 | 10/1955 | Roberts . |
| 2,834,903 | 5/1958 | Roberts . |
| 2,919,366 | 12/1959 | Mash . |
| 2,950,222 | 8/1960 | Hinson . |
| 3,037,138 | 5/1962 | Motson . |
| 3,310,703 | 3/1967 | Brooks . |
| 3,876,865 | 4/1975 | Bliss ................................ 283/904 X |
| 4,442,170 | 4/1984 | Kaule et al. ..................... 428/917 X |
| 4,455,039 | 6/1984 | Weitzen ............................ 283/904 X |
| 4,665,342 | 5/1987 | Topp et al. . |
| 4,708,914 | 11/1987 | Kamijo ............................ 428/690 |
| 4,741,976 | 5/1988 | Eguchi et al. .................... 428/690 |
| 4,887,003 | 12/1989 | Parker . |
| 4,931,138 | 6/1990 | Hashimoto ........................ 156/659.1 |
| 4,967,251 | 10/1990 | Tanaka et al. ................... 428/917 X |
| 5,352,543 | 10/1994 | Ryu ................................... 428/690 |
| 5,432,015 | 7/1995 | Wu et al. ........................ 428/690 |
| 5,486,738 | 1/1996 | Saika et al. ...................... 313/491 X |

Primary Examiner—Frances Han
Attorney, Agent, or Firm—Foley & Lardner

[57] ABSTRACT

Identification document characterized by an electroluminescence effect, the peculiarity of which consists of including a plurality of superimposed layers according to the following sequence:

one transparent support, one codification layer, said codification layer being fit for having a pre-established identification code, one first electric circuit, one first insulating layer, one electroluminescence layer, a second insulating layer, a second electrical circuit, one additional insulating layer, said first and second circuits being fit for lightening said electroluminescence layer by making use of alternating current through said circuits.

16 Claims, 1 Drawing Sheet

IDENTIFICATION DOCUMENT CHARACTERIZED BY AN ELECTROLUMINESCENCE EFFECT AND THE PROCEDURE FOR ITS REALIZING

This application is a division of application Ser. No. 08/230,192, filed Apr. 20, 1994, now abandoned.

The present invention concern an identification document better known as, among the technicians of the field, badge, characterized by an electroluminescence effect and the procedure for its realizing.

As it is well know, identification documents are much more in use to identify people autorized to acceed to particular areas, or to identify users or groups of users of specific services. They generally embody a codified information which can be read by special reading devices, better known as badge readers.

Among the various types of known badges, the main disadvantage is connected with the non-total safety of the codified information which can be so far easily detected. The aim of the present invention is to get rid of the above-complained disadvantage, by contriving an identification document characterized by an electroluminescence effect which grants a highly safe codified identification.

Within the above-mentioned aim the main goal of the present invention is to realize a highly reliable document, at competitive costs, relatively easy to be carried out.

The above-mentioned aim, as well as the hinted goals and further ones which will better come up afterwards, are fulfilled by an identification document characterized by an electroluminescence effect, the peculiarity of which consists of including a plurality of superimposed layers according to the following sequence:

one transparent support, one badge personalization layer, one codification layer, said codification layer being fit for having a pre-established identification code, one first electrical circuit, a first insulating layer, one electroluminescence layer, a second insulating layer, a second electrical circuit, an additional insulating layer, said first and second circuit being fit for establishing an electric field by implying alternating current fit for activating the electroluminescence.

Further characteristics and advantages of the invention will be chiefly evinced from the description of the chosen method of execution, however not exclusive, of an identification document characterized by an electroluminescence effect according to the invention, described by way of approximation and not of limitation in the attached drawing where:

the only exploded drawing represents the several layers making up the document according to the invention.

Referring to the only drawing, number 11 points out the document according to the invention.

Numbers ranking from 1 to 10 point out the several layers of the badge. Number 1 points out the transparent support made up with a synthetic material of acrylic type, polycarbonate, polyester, PVC or others on which all the remaining next layers are placed.

The first personalization layer 2 consists of a series of silk-screen printing realized on support 1 in order to personalize the badge, obtained through a diaphanie process which implies several colors in the above-mentioned film. The personalization, either the printing of several information regarding the badge identification or the names of firms or trademarks, is realized through silk-screen inks which allow a chemical fixing to layer 2, such procedure turns out to be save for the next stratifications which have to be carried out afterwards.

On the first personalization layer 2 one codification layer 3 is placed, said layers which is also placed on the whole badge surface.

Layer 3 is printed using a lay-out formed by a series of holes in negative form 14 through an opaque resin (non transparent) always using the silk-screen method. The number of holes 14 is proportional to the number of identification codes one may want to obtain. On the codification layer 3 a series of masks fit for covering a part of the holes according to a pre-established code are printed. This procedure can be realized through an ink-jet laser, or different technical method, profitably controlled by a computer, taking into consideration the high number of identification codes involved.

The code is formed by the transparent or opaque holes and by their combination.

The reading of the codes takes place through the light contrast coming from the next layers combined with the transparent holes of the codification layer 3.

The codification layer 3 is also useful as insulator for the electric circuit placed afterwards. On the codification layer 3 a first electric circuit is printed 4 through a silver-based silk screen paste. The circuit is placed in shape of a grid covering the layer 3 right where the transparent holes are placed 14 and has a side appendix which constitutes a first feeding area 12. The circuit, once feeded through contrast, anables to lighten the edges of the grid itself.

After placing the first electrical circuit 4 the badge is being kept inside a tunnel (oven) heated up to a temperature of 100°–120°C. This step is useful to reticulate the electric circuit 4 having the silver paste to become highly conductive. Furthermore this step can be carried out also through U.V. treated silver pastes. Such procedure, however, is not recommended because until now the U.V. technology has proved not to work properly under damp conditions.

After reticulating the first electric circuit 4, a first insulating layer is placed 5 through the printing of a two compounded transparent epoxy resin. Layer 5 acts as insulator between the electrical circuit 4 and the next layer compounded by zinc sulphides.

In order to reticulate the epoxy resin 5 the badge is once again introduced into a tunnel and exposed to the thermic treatment up to 100°–120° C. for a span of time of at least 60 minutes.

After this treatment the electroluminescence layer 6 is placed by means of a zinc sulphides silk-screen printing, properly treated, and a base of acrylic resin or equivalent, amalgamated each compound being present in proportion of 50%. Said layer will be the one to lighten up when some tension is applied to the opposite poles.

The bade is once again exposed to thermic treatment at 100°–120°C. in order to reticulate the latest applied resin. After the latest thermic treatment the second insulating layer 7 is placed through the printing of a two-compounded epoxy resin and a white resin. Layer 7 acts as insulator between the electroluminescence layer 6, compounded by zinc sulphides, and the next electric circuit. Furthermore by means of the white resin, said layer has the function to reflect the light coming from the electroluminescence layer 6 towards the badge surface on which the identification reading is to occur.

Layer 7 is not to exceed 60–70 mm thickness, to allow a capacitive effect between the two circuits, amidst which the electroluminescence layer is interposed 6. If layer 7 is too thick, it becomes necessary to increase the feeding current in order to activate the electroluminescent material (zinc sulphides) obtaining some negative effects with respect to safety during the reading of the document.

A second electric circuit 8 is placed through silk-screen printing by means of silver-based silk-screen paste. The second circuit 8 is printed in such a way that the first electric circuit is entirely traced 4, having a side appendix fit for constituting the second feeding area 13. As in the case of the printing of the first electric circuit 4 by making use of silver-based pastes silk-screen printed, a high resolution of the grids of circuits is obtainable.

After placing the second electric circuit 8, the badge is once more exposed to the thermic treatment at 100°–120° C. and kept in a tunnel (oven) for at least 60 minutes, to allow the circuit reticulation 8 making it conductive at the highest degree. In order to insulate the second electric circuit 8 an additional insulating layer is placed 9 by means of a silk-screen printing of a two-compounds epoxy resin.

Finally, a second personalization layer 2 is placed on layer 9, by means of a series of silk-screen printings, in order to obtain an additional personalization to the one of the first personalization layer 2, which was obtained by implying the multicolored diaphanie method on the above-mentioned film.

The proper working of the document according to the invention is as follows. During the identification, the badge is slotted in a special reading and identification device. The feeding areas 12 and 13 connect themselves with some feeding contacts included in the reader. Such feeding contacts furnish an alternating current to the two electric circuits 4 and 8 creating an electric field similar to the one present in the condensers, given that the first electric insulating layer 5 and the second insulating layer 7 work as they were a dielectric.

The so created electric field primes the electroluminescent material, that is namely the zinc sulphides of layer 6, which lights up. Given that the lighting takes place in all directions, the insulating layer 7, through the white resin, provides to reflect the light towards the upper layers following the direction according to which the photosensors are placed. Such reflected light, along with the light given out by the electroluminescence layer and directed towards the sensors, passes through the previously codified transparent holes 14 presenting a luminous code to the photosensors.

Such conceived invention is susceptible of numerous adjustments and variations which are all part of the same inventive concept. Finally all the details can be replaced with other technically equivalent. Basically the material employed, and still less the shapes and dimensions will be able to take any shape, without taking away from the ambit of the protection of the following claims.

I claim:

1. Procedure for realizing an identification document characterized by an electroluminescence effect and consisting of:
   preparing the transparent support
   placing a codification layer on said transparent support
   placing a first electric circuit on said codification layer
   placing a first insulating layer on said first electric circuit
   placing one electroluminescence layer on said first insulating layer
   placing a second insulating layer on said electroluminescence layer
   placing a second electric circuit on said second insulating layer
   placing one additional insulating layer.

2. Procedure, according to claim 1, characterized by placing a first personalization layer on said transparent support and by placing said codification layer on said first personalization layer.

3. Procedure, according to claim 1, characterized by placing a second personalization layer on said additional insulating layer.

4. Procedure, according to claim 1, characterized by the fact that said layers are printed according to the silk-screen method.

5. Procedure, according to claim 1, characterized by the fact that said support is made out of synthetic material.

6. Procedure, according to claim 1, characterized by the fact that said deposition of the first and second personalization layer consists of carrying out a series of silk-screen printings obtained through diaphanie method with at least one color.

7. Procedure, according to claim 1, characterized by the fact that said deposition on said codification layer consists of printing, according to the silk-screen method, a lay-out formed by a series of holes in negative form through an opaque resin.

8. Procedure, according to claim 1, characterized by the fact that said deposition of the first and second electric circuit consists of printing said electric circuit through silk-screen silver based pastes.

9. Procedure, according to claim 1, characterized by the fact that said deposition of the first and second insulating layer consists of printing, according to the silk-screen method, a two-compounded transparent epoxy resin.

10. Procedure, according to claim 1, characterized by the fact that said deposition of said second layer, consists in placing a white resin fit for reflecting light.

11. Procedure, according to claim 1, characterized by the fact that said deposition of said electroluminescence layer consists of printing according to the silk-screen method, some zinc sulphides and a base of acrylic resin.

12. Procedure, according to claim 1, characterized by the fact that said first electric circuit is placed being grid-shaped and covers a part of said transparent holes on said codification layer.

13. Procedure, according to claim 1, characterized by the fact that said deposition of the second electric circuit consists of placing said second electric circuit assuming a configuration which entirely treads said first electric circuit.

14. Procedure, according to claim 1, characterized by thermically treating said document further to said deposition of said electric circuits in order to reticulate said electric circuits and said resins in contact with said electric circuits.

15. Procedure, according to claim 1, characterized by thermically treating said document further to said deposition of said first insulating layer of said layer of electroluminescence and of said additional insulating layer to reticulate said resins constituing said first insulating layer, said electroluminescence layer and said additional insulating layers.

16. Procedure, according to claim 14, characterized by the fact that said thermic treatment consists in exposing said document up to the temperature of 100°–120° C. for a span of time of at least 60 minutes.

* * * * *